United States Patent Office 3,431,226
Patented Mar. 4, 1969

3,431,226
ACRYLIC POLYMER EMULSIONS
Henry Warson, Solihull, and George Andrew Reed, Thingwall, Birkenhead, England, assignors to The Dunlop Company Limited, London, England, a British company
No Drawing. Filed Nov. 12, 1964, Ser. No. 410,777
Claims priority, application Great Britain, Nov. 19, 1963, 45,537/63
U.S. Cl. 260—29.7                    5 Claims
Int. Cl. C08f 1/13, 15/40, 37/00

ABSTRACT OF THE DISCLOSURE

Acrylic polymer emulsions which are thickenable on addition of alkali comprising a polymer of at least one acrylic monoester, a copolymerizable acid monomer and a cross linking monomer having at least two unsaturated groups are prepared by polymerizing the monomer mixture in at least three separate stages and allowing at least 85% of the monomers added at each stage to polymerize before adding the monomers of the following stages. Latices of these polymers exhibit superior viscosity stability when thickened with alkali.

---

This invention relates to acrylic polymer emulsions, particularly emulsions for use in coating compositions. Such coating compositions are applied, for example, to leather and leather-like synthetic materials by known methods of padding, spraying or "curtain-coating." It is often important to the method of application that the emulsion should have a low solids content but be thickened i.e. have relatively high viscosity, and it is also important that the thickening should remain reasonably constant during at least the period of application. It is an object of this invention to provide an emulsion which can be thickened by the addition of alkali to a controlled reproducible and reasonably constant viscosity. By an "acrylic polymer emulsion" we means a dispersion of acrylic polymer particles in water.

According to the present invention an acrylic polymer emulsion which is controllably thickenable on addition of alkali comprises a polymer of at least one acrylic monomer with a copolymerizable acid and a small percentage of a cross-linking monomer.

The present invention also provides a process for preparing an acrylic polymer emulsion which is controllably thickenable on addition of alkali comprising polymerizing in emulsion at least one acrylic monomer with a minor proportion of a copolymerizable acid and a small percentage of a cross-linking monomer.

The polymerization is normally carried out in no more than five separate stages. The preferred number of stages is three, the total mixed monomers being added in proportions of 40 percent at the first stage, 30 percent at the second stage and 30 percent at the third stage. At each stage the monomers present are allowed to polymerize substantially so that at least 85 percent of the amount of monomers present has polymerized before the next addition of monomer is made. At each addition of monomers, polymerization is reinitiated by further addition of initiator.

It is preferred to use a cross-linking monomer which is at least partially water-soluble. Suitable cross-linking monomers are compounds having vinyl or allyl unsaturation containing at least two unsaturated groups capable of entering into polymerization or copolymerization. The preferred cross-linking monomers are diesters of acrylic or methacrylic acid, in particular ethylene glycol dimethacrylate and triethylene glycol dimethacrylate.

The small perecntage of cross-linking monomer which it is necessary to add will vary according to the number of polymerizable units in each molecule of the cross-linking monomer. In general, the percentage by weight of the cross-linking monomer multiplied by the number of polymerizable units in each molecule divided by its molecular weight should not exceed 0.04.

The copolymerizable acid should not be present to such an extent that it renders the emulsion alkali-soluble. It is preferred that the copolymerizable acid should amount to 8–15 percent of the total weight of mixed monomers. Suitable acids are acrylic and methacrylic acid.

The term "acrylic polymer" is used in this specification to include interpolymers of an acrylic monomer with one or more further acrylic monomers and/or with one or more nonacrylic monomers. In the latter case the polymer usually contains at least 37 percent by weight of acrylic monomers. Acrylic monomers include acrylic or methacrylic esters, acrylic or methacrylic acids or derivatives thereof. When the emulsions of this invention are used in coating compositions, pigments and fillers may be added or the emulsions may be blended with other emulsions or resins, natural oils or waxes.

It is usual when preparing an emulsion for transportation, storage etc. to produce an emulsion of fairly high solids content, i.e. of the order of 50 percent. For application as a coating composition an emulsion is diluted down to about 15 percent to 20 percent solids content. The particle size is preferably of the order of 0.1 micron, and the viscosity is substantially equal to that of water. When alkali is added thickening occurs so that the viscosity increases to give a reading on the Brookfield viscometer equivalent to a viscosity of the order of 50–200 poise. Since the thickened emulsion is a nonNewtonian fluid, the term "viscosity" as applied to it must be understood to mean no more than the property measured by the Brookfield viscometer.

The advantage of the emulsions of this invention over emulsions prepared from a polymer not containing a cross-linking monomer is that when alkali is added to the emulsions of this invention the thickening which takes place is controllable and reproducible and the thickened condition is maintained. Emusions prepared from acrylic monomers alone by a gradual addition of monomers during polymerization rather than a separate-stage process as herein disclosed were found to gel completely on addition of a very small amount of alkali in excess of the amount which caused no thickening.

Emusions prepared by a separate-stage process but not in the presence of a cross-linking monomer were found to be thickenable, but they tended to continue thickening to a gel condition or to thin down again with time.

The emulsions of this invention are thickenable on addition of alkali and not soluble in alkali. Therefore they result in a surface coating which has good water resistance and alkali resistance. This applies whether or not pigments are included in the coating composition.

The applicant's problem is illustarted in the following control experiments, and the invention is illustrated in the following examples, all parts being by weight.

Various terms used throughout the specification have been abbreviated for convenience, and these are as follows:

TDOS=Tetrasodium-N-(1,2 - dicarboxyethyl) - N - octadecyl sulphosuccinamate (35 percent active)
F10=Alkyl phenylether containing about 10 ethylene oxide units
F35=Alkyl phenylether containing about 35 ethylene oxide units
X200=Sodium salt of an alkylaryl polyether sulphonate FX85=Alkyl phenylether containing 10 ethylene oxide units
TDM=Tertiary-dodecyl mercaptan
B1=Fatty acid ether containing about 16 ethylene oxide units.

Control experiment A

This experiment was concerned with production of an acrylic polymer emulsion by gradual addition of mixed monomers. The apparatus used was a one-litre flask with three necks fitted with a stirrer, condenser, internal thermometer and tap funnel.

The monomers used were as follows:

Ethyl acrylate _____ 172
Methyl methacrylate _____ 10
Methacrylic acid _____ 18

The following ingredients were placed in the flask:

Water _____ 300
Sodium salt of oleyl methyl taurine _____ 12
Potassium persulphate _____ 1

5 percent of the total of the mixed monomer was initially supplied to the flask. The remainder of the mixed monomers was added gradually over 5 hours while the flask was maintained at 74° C.–78° C.

The emulsion produced had a total solids content of 40.3 percent. The relative viscosity of a 0.4 percent solution of the emulsion in benzene was 1.24. When the emulsion was diluted until it had a total solids content of 15 percent and ammonia was added until the pH was 9.0, it was found that the emulsion was completely soluble with only a slight increase in viscosity of about 2 poise. This showed that insufficient methacrylic acid was present among the monomers to cause thickening. The viscosity was measured with a Brookfield viscometer using spindle No. 6 and speed 50. Except where otherwise indivated, all measurements in the following experiments and examples were taken in this way. A film of 1 mm. thickness was prepared by well-known techniques from the emulsion and this film was bent sharply by hand in a refrigerated chamber to determine the low temperature crack point of the film which was −7° C.

Control experiment B

In the following experiment the mixed monomers were added in three separate stages. The apparatus was the same as that used in Experiment A. The monomers used were as follows:

Ethyl acrylate _____ 153
Methyl methacrylate _____ 29
Methacrylic acid _____ 18

The following ingredients were placed in the flask:

Water _____ 300
TDOS _____ 12
F10 _____ 4
F35 _____ 2.5

The following Redox system was used:

Ammonium persulphate _____ 0.8
Sodium formaldehyde sulphoxylate _____ 0.8

FeCl$_3$7H$_2$O was added to the extent of 4 parts of iron per million parts.

40 percent of the mixed monomers was poured into the flask. 40 percent of the Redox system in a small quantity of water (0.8 gramme in 5 cc.) was then added, care being taken to add the monomers and Redox system in separate streams which did not mix prior to entering the flask. The remainder of the mixed monomers was then added in two equal stages of 30 percent alternating with the addition of the corresponding amount of the Redox system. The flask was blanketed with nitrogen and polymerization took place at 35° C. The reaction was completed by addition of 0.3 gramme of cumene hydroperoxide and 0.05 gramme of sodium formaldehyde sulphoxylate, and heating at 50° C. for 1 hour.

The emulsion produced had a total solids content of 40.5 percent. The relative viscosity of an 0.4 percent solution of the emulsion in benzene was 1.10. When the emulsion was diluted to a total solids content of 15 percent and the pH was raised to 10 by the addition of ammonia, it was found that the viscosity had increased to 80 poise, but when the diluted emulsion was left to stand for 3 days at ambient temperature the product gelled. Thus, although this emulsion gave a reasonable thickening on addition of alkali, it continued to thicken until it reached a gel condition which is unsatisfactory for most application purposes. A film prepared from the emulsion had a low temperature crack point of −6° C.

Control experiment C

The monomers used were as follows:

Ethyl acrylate _____ 180
Methyl methacrylate _____ 6
Methacrylic acid _____ 14

The following ingredients were placed in the flask:

Water _____ 30
X200 _____ 16
F35 _____ 4
FX85 _____ 4
TDM _____ 0.2

The Redox system was the same as in Control Experiment B. Polymerization was carried out in the same manner as in Control Experiment B. The emulsion produced had a total solids content of 39.8 percent. The relative viscosity of a 0.4 percent solution of the emulsion in benzene was 1.08. When the emulsion was diluted to a total solids content of 15 percent and the pH was raised to 10 by addition of ammonia, it was found that the viscosity had increased to 60 poise, but when the diluted emulsion was left to stand overnight at ambient temperature, the viscosity decreased to about 4 poise. Thus, although the mercaptan was present in this case as a molecular weight controller, the emulsion did not maintain its thickened condition. A film prepared from the emulsion had a low temperature crack point of −8° C.

EXAMPLE I

The monomers used were as follows:

Ethyl acrylate _____ 172
Methacrylic acid _____ 24
Ethylene glycol dimethacrylate _____ 4

The following ingredients were placed in a flask:

Water _____ 300
TDOS _____ 16
FX85 _____ 6

The Redox system used was the same as in Control Experiment B. Polymerization was carried out in the same manner as in Control Experiment B. The emulsion produced had a total solids conent of 38.6 percent. The relative viscosity of an 0.4 percent solution of the emulsion in benzene was 1.24. When the emulsion was diluted to 15 percent total solids content and the pH was raised to 10 by addition of ammonia, it was found that the emulsion had a viscosity of 60 poise. This viscosity was maintained for a considerable period. A film prepared from the emulsion had a low temperature crack point of −8° C.

EXAMPLE II

The monomers used were as follows:

Ethyl acrylate _____ 127
Butyl acrylate _____ 50
Methacrylic acid _____ 22
Ethylene glycol dimethacrylate _____ 2.5

The following ingredients were placed in the flask:

| | |
|---|---|
| Water | 300 |
| X200 | 24 |
| B1 | 6 |

The same Redox system was used as in Control Experiment B. Polymerization was carried out in the same way as in Control Experiment B. The emulsion produced had a total solids content of 40.0 percent. The relative viscosity of a 0.4 solution in benzene was 1.31. When the emulsion was diluted to a total solids content of 15 percent and the pH was raised to 10 by the addition of ammonia, it was found that the viscosity was 60 poise. After standing for 2½ hours, the viscosity had increased to 100 poise but thereafter a constant viscosity was maintained with increase or decrease not exceeding 10 poise. A film prepared from the emulsion had a low temperature crack point of −14° C.

EXAMPLE III

The following monomers were used:

| | |
|---|---|
| Ethyl acrylate | 159 |
| 2-ethylhexyl acrylate | 20 |
| Methacrylic acid | 20 |
| Ethylene glycol dimethacrylate | 1.8 |

The following ingredients were placed in the flask:

| | |
|---|---|
| Water | 300 |
| X200 | 20 |
| FX85 | 6 |

The same Redox system was used as in Control Experiment B. Polymerization was carried out in the same way as in Control Experiment B. The emulsion produced had a total solids content of 38.6 percent. The relative viscosity of a 0.4 percent solution in benzene was 1.40. When the emulsion was diluted to a total solids content of 15 percent and the pH was raised to 9.2 by the addition of ammonia, it was found that the viscosity was 124 poise. This viscosity was well-maintained although a slight gelling tendency was observed after about 7 days. A film cast from the emulsion had a low temperature crack point below −17° C.

Having now described our invention, what we claim is:

1. A process for preparing an acrylic polymer emulsion which is controllably thickenable on addition of alkali, comprising polymerizing, in aqueous emulsion and in the presence of emulsifier and a water soluble redox system, a monomer mixture containing at least one acrylic monoester monomer with a copolymerizable acid monomer and a cross-linking monomer having at least two unsaturated groups capable of entering into polymerization, said copolymerizable acid monomer comprising about 8 to 15 percent by weight of said monomer mixture, and said cross-linking monomer being present in an amount such that the value obtained when its percentage by weight is multiplied by the number of polymerizable units in each molecule and divided by its molecular weight does not exceed about 0.04, said monomer mixture being polymerized in at least three separate stages, allowing at least about 85% of the monomers added in a given stage to polymerize before adding the monomers of the following stage, the relative amounts of said monomers present in each stage being substantially the same and a substantially equivalent proportion of the redox system being added at each stage.

2. A process according to claim 1, in which said redox system is based on a persulphate salt and a reducing acid of sulphur.

3. A process according to claim 1, wherein the polymerizing of said monomers is carried out in from three to five separate stages.

4. A process according to claim 3, wherein the amount of said monomers used in any one of said stages is up to 50% of the total amount of said monomers used in all of said stages.

5. A process according to claim 1, wherein said acrylic monoester monomer is selected from the group consisting of acrylic and methacrylic acid monoesters, said copolymerizable acid monomer is selected from the group consisting of acrylic and methacrylic acids, and said cross-linking monomer is selected from the group consisting of acrylic and methacrylic acid diesters.

References Cited
UNITED STATES PATENTS

| | | | |
|---|---|---|---|
| 3,104,231 | 9/1963 | Fitch | 260—29.7 |
| 3,170,888 | 2/1965 | Kutik et al. | 260—29.6 |
| 3,244,655 | 3/1966 | Sullivan et al. | 260—29.6 |
| 3,296,175 | 1/1967 | Fantl et al. | 260—29.6 |
| 2,413,973 | 1/1947 | Howk et al. | 260—89.5 |
| 2,726,230 | 12/1955 | Carlson | 260—86.1 |

SAMUEL H. BLECH, *Primary Examiner.*

J. T. GOOLKASIAN, *Assistant Examiner.*

U.S. Cl. X.R.

260—80.8, 80.81, 78.5, 29.6